(12) United States Patent
Kim

(10) Patent No.: US 7,006,078 B2
(45) Date of Patent: Feb. 28, 2006

(54) APPARATUS AND METHOD FOR SENSING THE DEGREE AND TOUCH STRENGTH OF A HUMAN BODY ON A SENSOR

(75) Inventor: Wonchan Kim, Hyosung Villa (KR)

(73) Assignee: McQuint, Inc., Englewood, NJ (US)

( * ) Notice: Subject to any disclaimer, the term of this patent is extended or adjusted under 35 U.S.C. 154(b) by 541 days.

(21) Appl. No.: 10/140,394

(22) Filed: May 7, 2002

(65) Prior Publication Data

US 2003/0210809 A1    Nov. 13, 2003

(51) Int. Cl.
*G09G 5/00* (2006.01)
*G06K 11/16* (2006.01)

(52) U.S. Cl. .................................. 345/173; 178/18.06

(58) Field of Classification Search ................ 345/173, 345/174; 702/47, 53; 341/33, 34, 22, 20; 307/135, 137; 178/18.05, 18.06, 19.04; 340/545.4; 382/124

See application file for complete search history.

(56) References Cited

U.S. PATENT DOCUMENTS

| | | | | |
|---|---|---|---|---|
| 3,736,445 A | * | 5/1973 | Van Sickle | 327/517 |
| 3,819,108 A | * | 6/1974 | Jordan | 231/7 |
| 4,001,676 A | * | 1/1977 | Hile et al. | 324/678 |
| 4,090,092 A | * | 5/1978 | Serrano | 200/600 |
| 4,145,748 A | * | 3/1979 | Eichelberger et al. | 178/18.01 |
| 4,159,473 A | * | 6/1979 | Senk | 340/565 |
| 4,290,052 A | * | 9/1981 | Eichelberger et al. | 341/33 |
| 4,291,303 A | * | 9/1981 | Cutler et al. | 345/174 |
| 4,339,746 A | * | 7/1982 | Ulicki et al. | 340/518 |
| 4,353,056 A | * | 10/1982 | Tsikos | 382/124 |
| 4,394,773 A | | 7/1983 | Ruell | |
| 4,539,554 A | * | 9/1985 | Jarvis et al. | 310/311 |
| 4,550,310 A | * | 10/1985 | Yamaguchi et al. | 307/99 |
| 4,571,454 A | * | 2/1986 | Tamaru et al. | 178/18.06 |
| 4,581,483 A | * | 4/1986 | Ralston | 178/20.01 |
| 4,814,692 A | * | 3/1989 | Baumann | 324/607 |
| 4,853,498 A | * | 8/1989 | Meadows et al. | 345/174 |
| 5,010,772 A | * | 4/1991 | Bourland et al. | 73/862.046 |
| 5,225,636 A | * | 7/1993 | Protheroe | 178/18.05 |
| 5,260,637 A | * | 11/1993 | Pizzi | 320/103 |
| 5,325,422 A | | 6/1994 | Ladd | |
| 5,325,442 A | * | 6/1994 | Knapp | 382/124 |
| 5,414,413 A | * | 5/1995 | Tamaru et al. | 345/175 |
| 5,499,026 A | * | 3/1996 | Liao et al. | 341/33 |
| 5,670,755 A | * | 9/1997 | Kwon | 178/18.05 |
| 5,777,607 A | * | 7/1998 | Koolen | 345/174 |
| 5,783,875 A | | 7/1998 | Jaros | |
| 5,801,340 A | * | 9/1998 | Peter | 178/20.04 |
| 5,828,773 A | * | 10/1998 | Setlak et al. | 382/126 |
| 5,831,597 A | * | 11/1998 | West et al. | 345/163 |
| 5,861,583 A | * | 1/1999 | Schediwy et al. | 178/18.06 |
| 5,861,875 A | * | 1/1999 | Gerpheide | 345/174 |
| 5,898,426 A | * | 4/1999 | Kim | 345/173 |
| 5,905,489 A | * | 5/1999 | Takahama et al. | 345/174 |
| 5,907,627 A | | 5/1999 | Borza | |

(Continued)

*Primary Examiner*—Ryan Yang
(74) *Attorney, Agent, or Firm*—Buchanan Ingersoll PC; Dennis M. Carleton

(57) ABSTRACT

An improvement in sensor for detecting contact with a human resistive element is disclosed. This design uses additional components to avoid discharging capacitors through the human resistive element, thereby sparing the user the uncomfortable sensation associated therewith and increasing the power requirements of the device. In addition, designs are utilized which multiple sensing points are multiplexed to achieve greater resolution while with a lower pin count at the signal processing chip.

8 Claims, 8 Drawing Sheets

U.S. PATENT DOCUMENTS

| | | | |
|---|---|---|---|
| 5,949,257 A | 9/1999 | Ishikawa | |
| 5,949,354 A * | 9/1999 | Chang | 341/33 |
| 5,990,804 A * | 11/1999 | Koyama | 340/5.82 |
| 6,049,620 A * | 4/2000 | Dickinson et al. | 382/124 |
| 6,075,520 A * | 6/2000 | Inoue et al. | 345/173 |
| 6,259,804 B1 * | 7/2001 | Setlak et al. | 382/124 |
| 6,438,257 B1 * | 8/2002 | Morimura et al. | 382/124 |
| 6,639,587 B1 * | 10/2003 | Carpenter et al. | 345/173 |
| 6,661,410 B1 * | 12/2003 | Casebolt et al. | 345/173 |
| 6,686,546 B1 * | 2/2004 | Chiu | 178/18.01 |
| 6,717,666 B1 * | 4/2004 | Satou et al. | 356/311 |
| 6,768,294 B1 * | 7/2004 | Moldavsky et al. | 324/76.39 |
| 6,795,359 B1 * | 9/2004 | Baker | 365/209 |
| 2002/0043998 A1 * | 4/2002 | Misdom et al. | 327/205 |
| 2002/0125994 A1 * | 9/2002 | Sandau et al. | 340/5.62 |
| 2002/0149571 A1 * | 10/2002 | Roberts | 345/174 |
| 2003/0067451 A1 * | 4/2003 | Tagg et al. | 345/174 |

* cited by examiner

APPARATUS AND METHOD FOR SENSING THE DEGREE AND TOUCH STRENGTH OF A HUMAN BODY ON A SENSOR

FIELD OF THE INVENTION

This invention relates generally to the field of fingerprint sensors and touchpads for security devices, computer peripherals, and mobile data processing systems and, in particular to an improvement over the prior art devices which eliminates the DC-current component and reduces the number of connection pins from the sensor to the signal processing chip.

BACKGROUND OF THE INVENTION

This invention relates to the sensing of the level of contact between parts of the human body and a sensor. In the prior art, the types of technologies that sense the level of human body contact have incorporated technology that uses various semiconductor devices, such as those shown in U.S. Pat. No. 4,353,056 (Tsikos), entitled "Capacitive Fingerprint Sensor," and U.S. Pat. No. 5,325,442 (Knapp), entitled "Fingerprint Sensing Device And Recognition System Having Predetermined Electrode Activation."

One problem with these types of sensors is that the semiconductor devices used for the sensors have the liability of being sensitive to contamination and being vulnerable to damage by external forces. As a result, technologies that are independent of semiconductor sensors are considered more desirable.

Such a prior art sensor is shown in FIG. 1. Prior art technologies that sense the level of human body contact generally comprise a sensing component or components, shown as reference number 10 in FIG. 1, and a voltage component that provides operating voltage to the sensing component. Typically, the sensing component senses the level of human body contact and sends the outcome to an arbitrary electronic device, such as a signal processing chip (not shown).

The sensing component of the prior art sensor 10 of FIG. 1 comprises a sensing point 3, parasitic capacitor 1 and output device 2, for example, an inverter.

In operation, the user initiates contact with the device by placing a finger on sensing point 3, and becomes part of the circuit, in general appearing as a resistor 4 connected to ground. Any electrical charge stored in the parasitic capacitor 1 would flow through the human body resistive path 4 to ground, thereby discharging capacitor 1. As a result, the voltage level at node $P_1$ would fall, causing the output of inverter 2 to rise, leading to a high output of sensor 10.

One problem with the prior art device of FIG. 1 is that the sensing device 10 is generally configured using a continuous activation method, in which capacitance 1 must re-charge while the human body is in contact with sensing point 3. After the charging of the capacitor 1 is completed, the determination of whether the human body is in contact with sensing point 3 is made by sensing whether the charging voltage is maintained.

When this method is used, the body of the user is in contact with sensing point 3 while capacitor 1 is being charged, and thus the user is subject to the danger of excess direct current flowing through the body. These kinds of direct currents, while generally not life threatening, could cause uneasiness and discomfort to the user.

From the viewpoint of device performance, the prior art configuration also causes some practical difficulties. If the amount of current flowing through the body is too great, the amount of power consumption will be much more than necessary, thereby increasing the total power consumption of the device. This is especially troublesome for portable type devices which may draw operational power from a battery.

Yet another problem with the prior art device exists in connection with the physical size and resolution of the device. Typically, sensing device 10 is connected to a signal processing chip, where there is a one-to-one correspondence between pins on the chip and a plurality of sensing devices 10. For the sensor to work with sufficient precision, the resolution should be at least 500 dpi. With a typical human finger being about 1 cm in width, there must be at least 400 sensing devices 10 to enable normal operation, and the signal processing chip must therefore have an equivalent number of individual pins for it to process the information from the sensing devices. This leads to excessively large devices and/or high production costs to incorporate the large number of connections in a reasonable area.

Because of these problems, the practical uses of the prior art devices are limited. It would therefore be advantageous and desirable to have a sensing device which alleviates the aforementioned problems extant in the prior art devices.

SUMMARY OF THE INVENTION

Disclosed herein is a device that senses the strength level of human body contact and the methods for using the device. The device of the present invention is an improvement over the prior art that overcomes the undesirable characteristics of the prior art devices. Specifically, the device of the present invention utilizes a novel configuration that senses the level of human body contact by observing the redistribution of the stored charge, thereby minimizing the amount of direct current flowing through the body of the user. Even when used in continuous activation mode, the phenomenon of current continuously flowing though the body can be prevented, which eliminates the possible discomfort and anxiety felt by the user. Additionally, the power consumption of the device is decreased.

Further, the device of the present invention utilizes multiplexed passive circuit elements, which maximizes the effectiveness of each sensing circuit element and requires fewer connections with the signal processing chip.

DETAILED DESCRIPTION OF THE INVENTION

Figure 1:
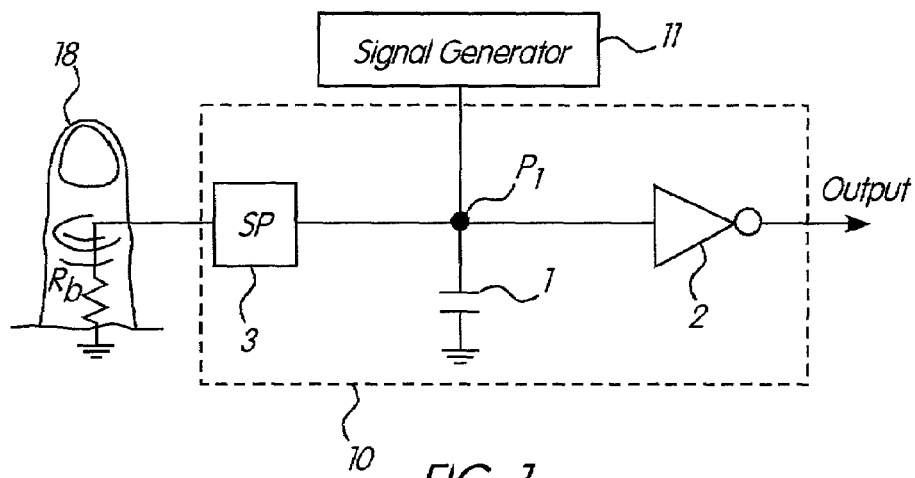
FIG. 1 is a schematic of an example of a prior art device.
Figure 2:
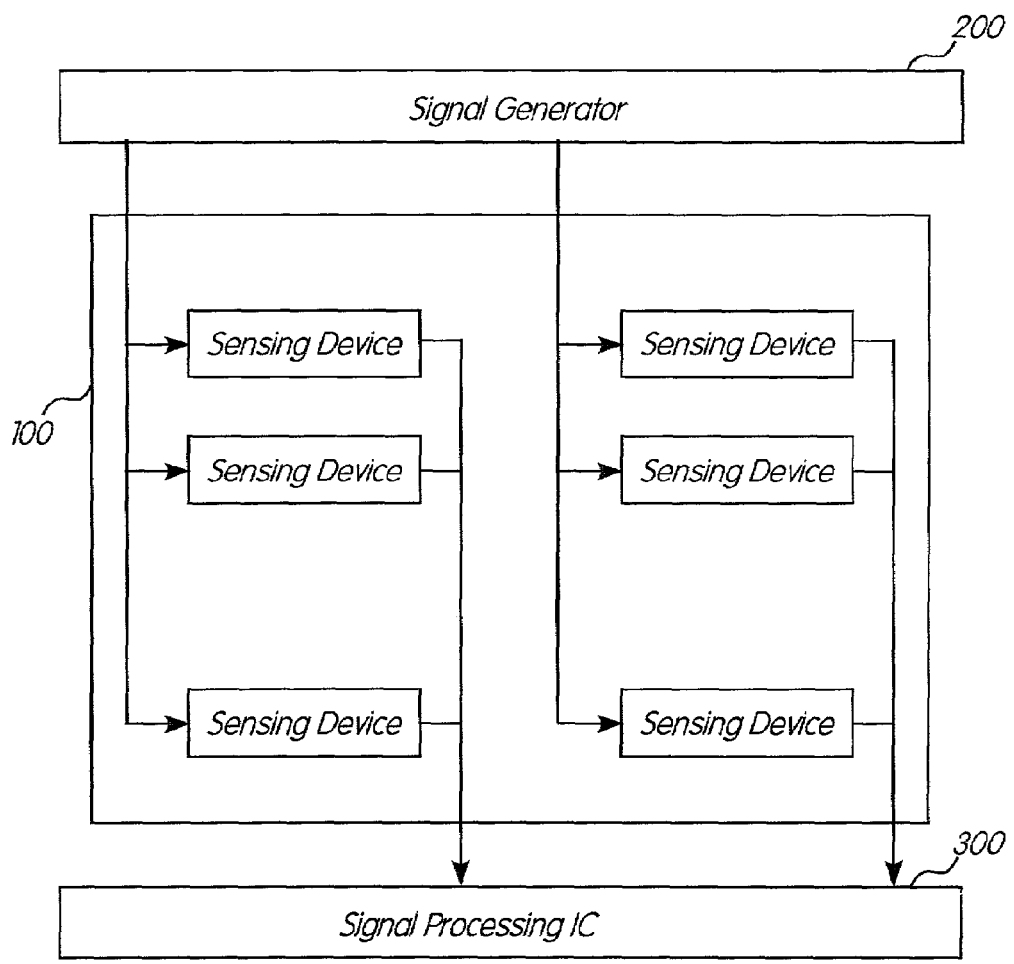
FIG. 2 is a block diagram showing the improvement of the present invention

A block diagram of the preferred embodiment of the sensor of the present invention is shown in FIG. 2. The sensor consists of a array 100 of sensing devices 20 that are electrically connected to signal processing chip 300. Signal generator 200 sends controlled input power each of sensing devices 20 in array 100. Sensing devices 20 output static and dynamic signals to signal processing chip 300, depending on whether or not there is human contact, and will output a different signal, depending on the level of human contact.

Figure 3:
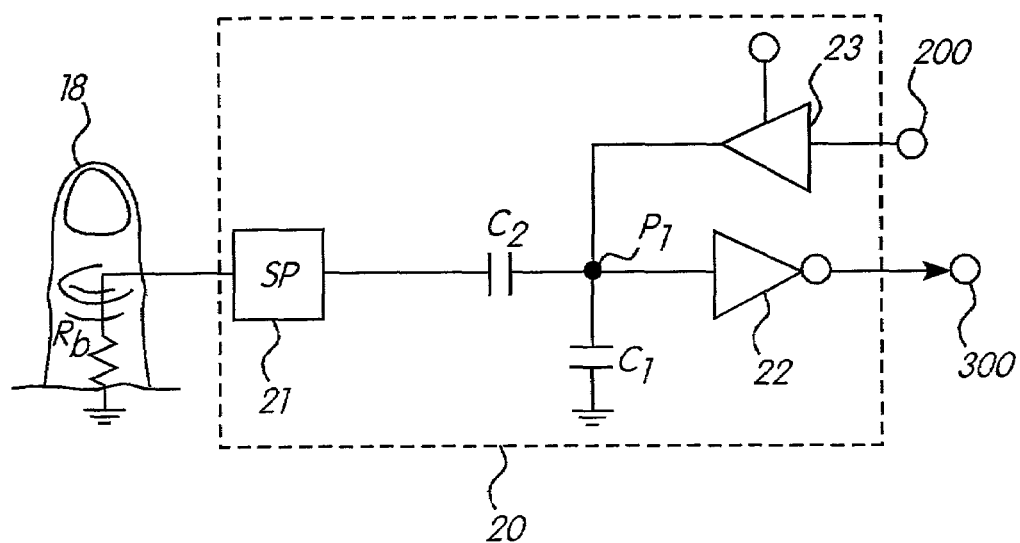
FIG. 3 is a schematic of a device according to the present invention.

The simple sensing device shown in FIG. 3 can act as one of a plurality of sensing devices 20 in array 100 of sensing devices as shown in FIG. 2, receiving input from signal generator 200 that sends controlled power to selected sensing elements array 100.

The sensing device of FIG. 3 consists of sensing point 21 that provides a place for contact with a portion of a human body, most likely a finger 18, output device 22 that outputs static or dynamic signals depending on the level of human body contact, and capacitor $C_1$ which stores the power from the power source for a preset time, and which provides part of the stored electrical charge for capacitor $C_2$, which is electrically coupled to capacitor $C_1$ and which forms an RC delay circuit by interaction with the human resistive element $R_b$ provided by human body 18 and redistributes the electrical charge provided by the capacitor $C_1$, depending on the RC time constant. The voltage of the capacitor $C_1$ is thereby changed depending on the RC time constant.

Figure 4:
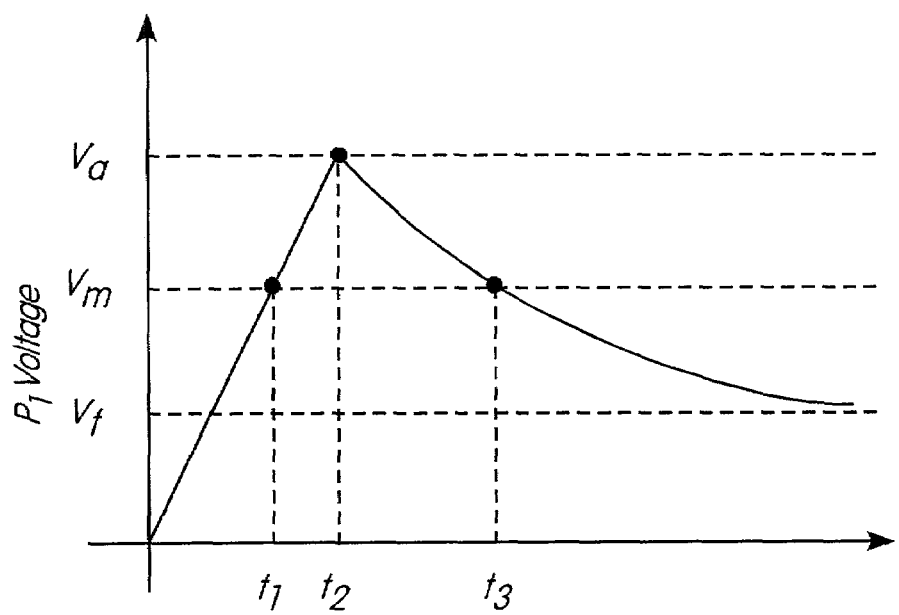
FIG. 4 is a graph of the change over time of the voltage at nod $P_1$ in FIG. 2.

The operation of the circuit of FIG. 3 is shown in FIG. 4. In operation, capacitors $C_1$ and $C_2$ are first discharged, thus "initializing" them, and, using the signal from signal generator 200 and buffer 23, the voltage $V_a$ is supplied to node $P_1$. At time $t_2$, capacitor $C_1$ is charged to $V_a$. If there is no human body contact during presetting, the capacitor $C_1$ maintains its voltage of $V_a$.

When human body 18 comes in contact with sensing point 21 after time $t_2$, the resistance $R_b$ supplied by human body part 18, along with capacitor $C_2$, forms an RC circuit element which is dependant on the level of contact with body part 18. As capacitor $C_1$ starts to discharge through capacitor $C_2$, the voltage at node $P_1$ approaches $V_f$ as shown in FIG. 4. Voltage $V_f$ is formed when equilibrium is reached after the charge redistribution between capacitors $C_1$ and $C_2$. When this happens, the final voltage $V_f$ assumes the value of Equation 1, and the redistribution behaviors follows the usual RC delay circuit with an RC time constant as shown in Equation 2.

$$V_f = \frac{C_1}{C_1 + C_2} V_a \quad (1)$$

$$RC \text{ time constant} = R_b\left(\frac{C_1 C_2}{C_1 + C_2}\right) \quad (2)$$

As the voltage at node $P_1$ falls from Va to Vf, it will, at some point $t_3$, fall below $V_m$, the threshold voltage of the output element. In the simplest case, device 22 is an inverter and, as the voltage at node $P_1$ changes to a falls from a HIGH level to a LOW level, at t3, the output of 22 will assume a HIGH value. Thus output element 22 sends the signal and duration time of the level of human contact to the signal processing chip 300. The decay of the voltage at node $P_1$ is dependent upon the value of $R_b$, which is dependent upon level of contact between human body part 18 and sensing point 21.

Prior to this invention (i.e., without capacitor $C_2$), the fact that there was contact between human body part 18 and sensing point 21 was detected via the flow of the electrical charge in capacitor $C_1$ directly through human body part 18, possibly causing discomfort to the user.

As stated previously, in the prior art devices, if the continuous activation method is used, the body of the user is in contact with the sensing point while capacitor $C_1$ is being charged, and thus the user is subject to the danger of excess direct current flowing through the body. Additionally, the undesirable effect of excess power consumption will cause an increase in total power consumption.

The use of the circuit in FIG. 3 eliminates these undesirable characteristics of the prior art. When the circuit of FIG. 3 is utilized in the continuous activation mode, capacitors $C_1$ and $C_2$ must be discharged, thus "initializing" them, and, using the power source 200 and buffer 23 the voltage $V_a$ is supplied to node $P_1$. While capacitor $C_1$ is charged to $V_a$, human body part 18 may maintain contact with the sensing point 21.

Because capacitor $C_2$ forms an RC-circuit with the human resistive element $R_b$, and because the voltage $V_a$ is charged at the capacitor $C_1$ at a much smaller time than the $R_b C_2$ time constant, capacitor $C_2$ is hardly charged at all while capacitor $C_1$ is re-charged to $V_a$. After capacitor $C_1$ is charges to $V_a$, the voltage at node $P_1$ will start to decay toward $V_f$. The rate of decay will be defined by the RC time constant.

Figure 5:
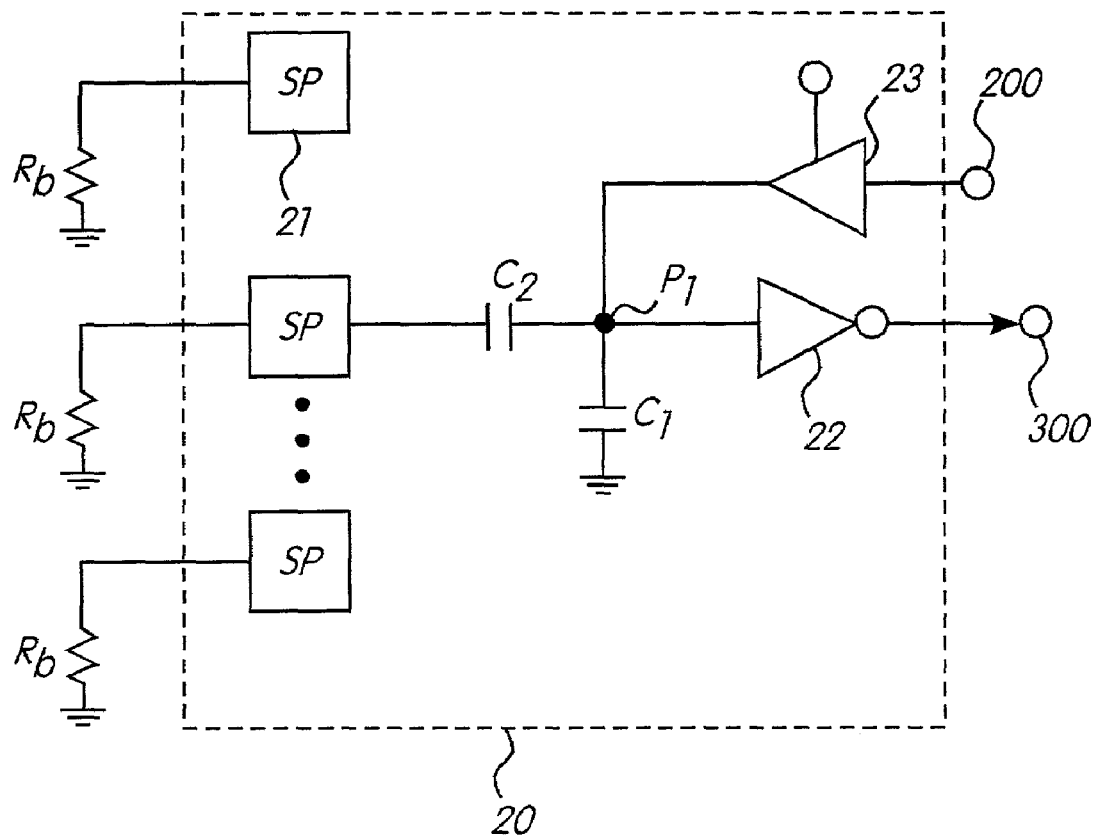
FIG. 5 is a schematic of another embodiment the present invention using multiplexed sensors.

A second embodiment of the invention, shown in FIG. 5, allows the sensing device to be used in "sweeping mode," that is, the human body part 18 is swept over an array of sensing points. In this embodiment, the resolution of human body contact image can be increased by dividing the sensing point 21 of FIG. 3 into a plurality of sensing points 21, as shown in FIG. 5.

Figure 6:
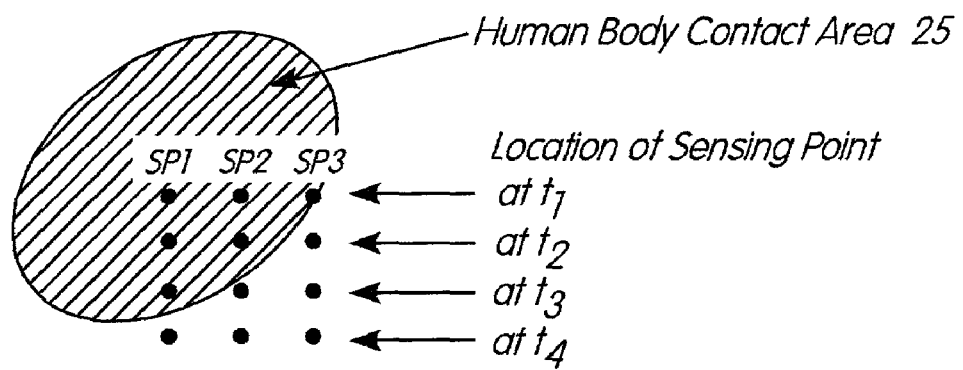
FIG. 6 shows the change in the contact over time between a finger and a plurality of sensing points in a sensing array.

As shown in FIG. 6, where the shadowed region 25 shows the area of human body contact, it can be seen that while the contact area moves over sensing points $SP_1$, $SP_2$, and $SP_3$, at time $t_1$ all sensing points are in contact with the human body part, at time $t_2$ two sensing points are in contact, at time $t_3$, one sensing point is in contact, and at time $t_4$, no sensing points are in contact. According to the number of contacts, the effective value of body contact resistance value $R_b$ varies and this value can be detected by the resulting RC curve (the internal between $t_2$ and $t_3$) as shown in FIG. 4. The configuration of FIG. 5 has the advantage of increasing the resolution of the sensor without increasing the number of connection points with signal processing chip 300.

Figure 7:
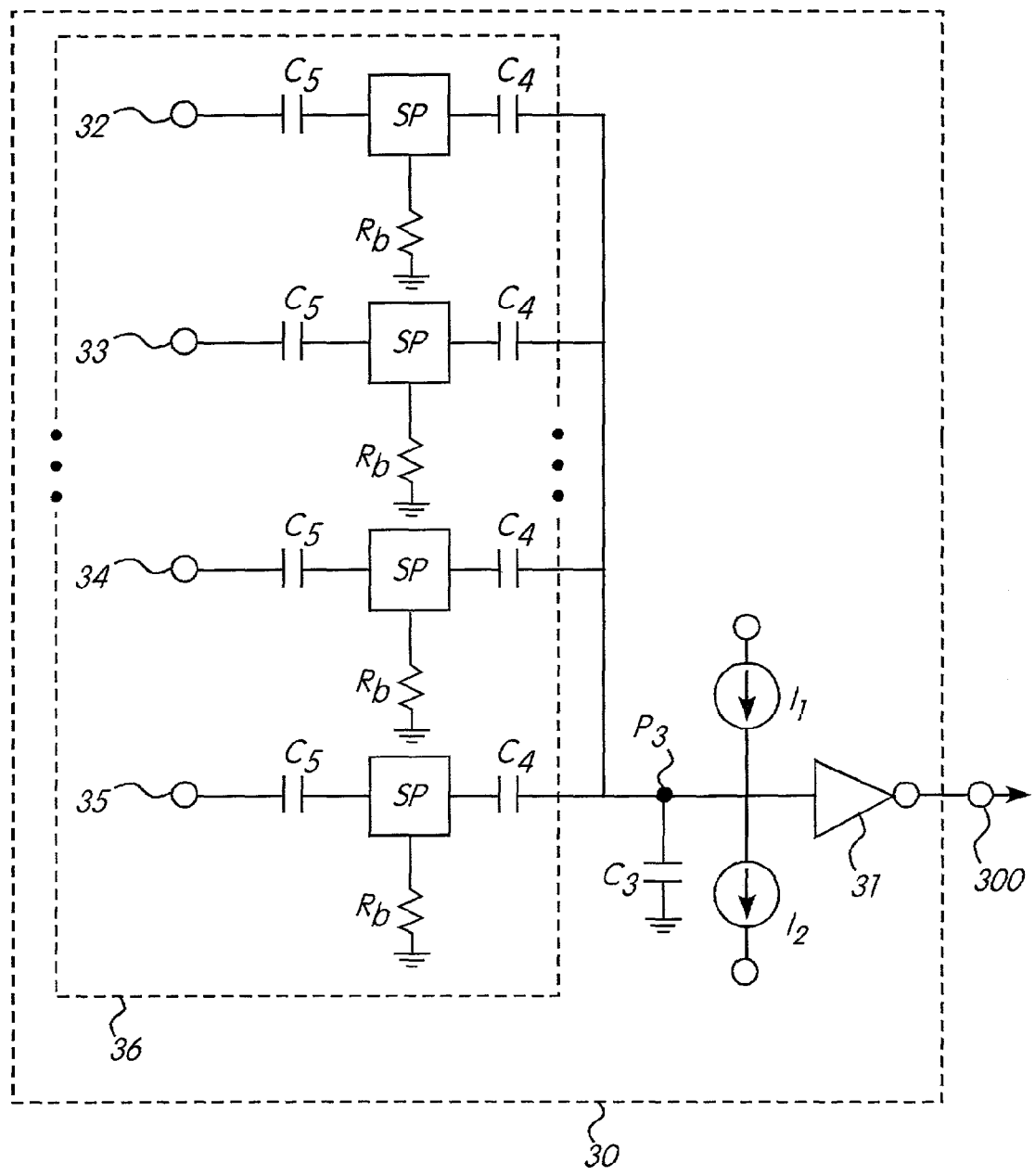
FIG. 7 is a schematic of another embodiment of the invention wherein the sensing devices can be selected.

This kind of reduction of connecting pins to the signal processing chip can be made more systematically by the embodiment shown in FIG. 7. Here, array 36 of passive elements is connected to the capacitor $C_3$ and selectively controls the amount of discharge therefrom.

As is shown in FIG. 7, the passive element array 36 is a combination of a plurality of parallel sensing points 37 and corresponding charge redistribution capacitors $C_4$, which form the RC circuit with the human body resistance $R_b$, and which influence the charge redistribution action that depends on the RC time constant when the charge of capacitor $C_3$ is redistributed. Selecting nodes (32, 33, . . . ,34, 35) receive signals from external sources and selectively influence the charge, or discharge action of the charge redistribution capacitors $C_4$ and the capacitor $C_3$. Between the charge redistribution capacitors $C_4$ and the selecting nodes (32, 33, . . . , 34, 35) there are multiple capacitors $C_5$ that have a one to one correspondence to the charge redistribution capacitors $C_4$ and that transmit the change in voltage when selecting voltage is applied by the selecting nodes (32, 33, . . . ,34, 35). This has the effect of "selecting" or "deselecting" certain of sensing points 37.

Figure 8:
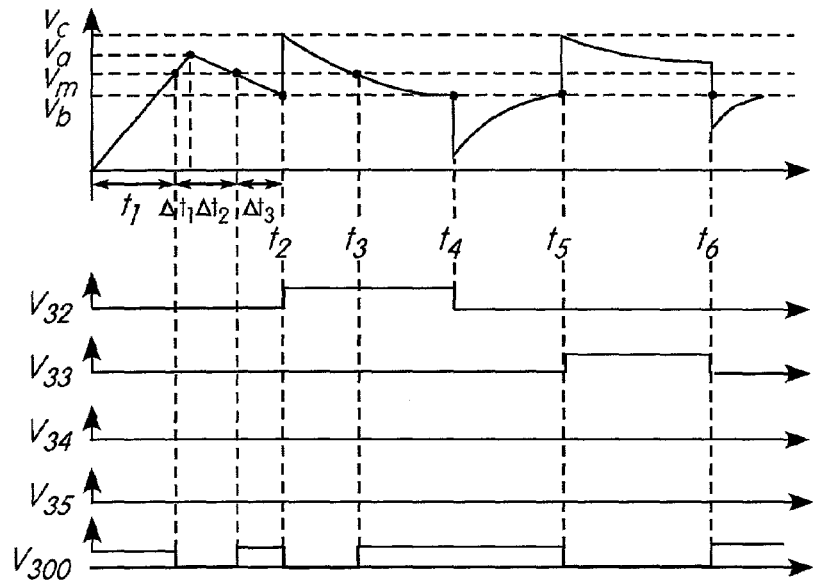
FIG. 8 is a timing diagram showing the change in the voltage at nod $P_3$ over time as a function of the voltages on the sensor selecting lines for the circuit of FIG. 7.

In operation, the configuration of FIG. 7 work as follows. First, selecting nodes (32, 33, . . . ,34, 35) and node $P_3$ are grounded, and all the capacitor voltages are, "initialized" zero charge using current sink $I_2$, as shown in the timing diagram of FIG. 8. Current is then supplied to the storage nodes $P_3$, using current source $I_1$ from the supply voltage source (200). At time $t_1$, the voltage at node $P_1$ reaches the threshold voltage $V_m$ and the output of device 31 flips. (i.e., changes from HIGH to LOW if device 31 is an inverter). Power source(200) and the current source $I_1$ supply power to node $P_3$ for the time $\Delta t_1$. At this time, capacitors $C_3$, $C_4$ and $C_5$ are charged, and the voltage at node $P_3$ reaches $V_a$.

When this state is reached, the sensing device turns current source $I_1$ to an off state, and turns the current sink $I_2$ on for the time $\Delta t_2$, and $\Delta t_3$, enabling capacitor $C_3$ to be discharged to voltage $V_b$ which is a lower than the threshold voltage $V_m$ of the output device 31.

After current sink $I_2$ is turned to an off state, there is a set amount of charge stored in the capacitors around node $P_3$, and this charge is stored in a state that is electrically isolated from external influences. In this state, the sensing device sends a voltage pulse to selecting nodes (32, 33, . . . ,34, 35) in a particular order and activates them. As an example, a selection voltage pulse is sent to a node, for example to node 32. When rise time of the pulse is sufficiently short enough compared to the RC time constant determined by the human body contact resistance, then, during the short time the voltage pulse is applied, the voltage at node $P_3$ rises, at time $t_2$ to voltage $V_c$ of the, according to the combined capacitance of $C_3$, $C_4$ and $C_5$. If there is a human body part in contact with sensing point 37 coupled to the activated selecting node then the voltage at node $P_3$ follows an RC curve and at time t3 falls below the threshold voltage of the output device, and the output state of output device 31 flips. Due to this, output device 31 is able to send a signal that represents that there has been contact with a human body to the signal processing chip 300.

After this evaluation process with selecting node 32 is completed, the sensing device deselects sensing point 37 connected to selecting node 32 at time $t_4$. At this time, the voltage at node $P_3$ drops and begins to rise following an RC curve until $V_b$ is reached or until the next node is selected. At time t5 in the diagram, selecting node 33 is activated, and, as at time t2, the voltage at node $P_3$ rises to $V_c$. If sensing point 37 connected to selecting node 33 is in contact with a human body part, then the process just described with respect to selecting node 32 repeats for selecting node 33. However, if activated selecting node 33 is not in contact with the human body, then additional voltage has been applied to node $P_3$, which means that even after a set time has passed, the voltage of node $P_3$ does not fall under the voltage $V_m$, and due to this, the output of output device 31 does not change.

According to a predefined order, a voltage selecting pulse is sent to successive selecting nodes (32, 33, . . . ,34, 35) and the voltage at node $P_3$ will either remain above the threshold voltage $V_m$, or fall below it, depending n whether or not there is human body contact with the activated sensing point 37.

Figure 9:
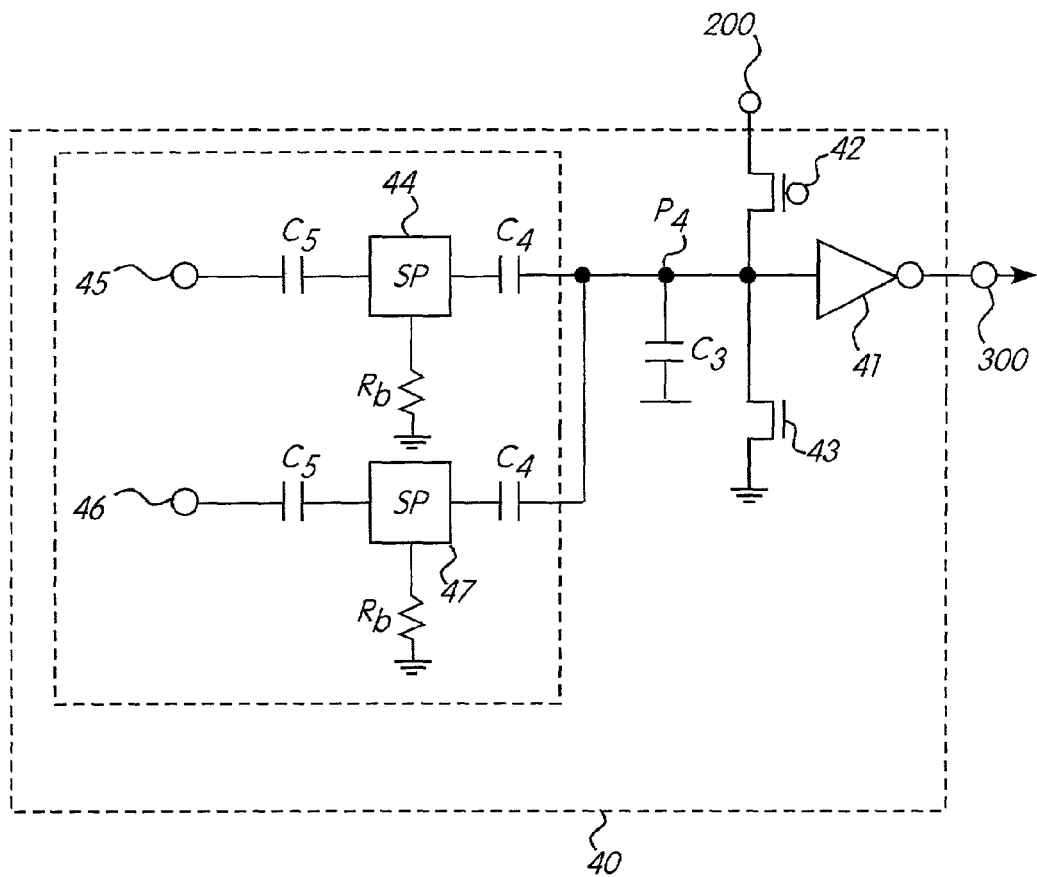
FIG. 9 is a schematic of yet another embodiment of the present invention.

In another embodiment of the invention, which is a variation of the circuit of FIG. 7, in the circuit of FIG. 9, current source $I_1$ and inverter 31 can, for example, be replaced by transistor 42 and comparator 41. When this configuration is used, the sensing device uses another operational mode to sense the level of human body contact.

First, the sensing device discharges capacitors $C_3$, $C_4$, and $C_5$. Then, all of the selecting nodes 46 are grounded, except for one selecting node 45. Transistors 42 and 43 are used to raise the voltage at node $P_4$ up to voltage Va. (For purposes of explanation, only two sensing points 44 and 47 are shown as being associated with sensing device 40).

In this embodiment, as in previous embodiments, the combination of capacitors, forms an RC circuit with the human resistive element $R_b$. If the charging time of capacitor $C_3$ is sufficiently shorter than the RC time constant, the voltage of charge redistribution capacitors $C_4$, and $C_5$ connected to selected node 45 do not undergo a sudden change in charge. However, the combination of $C_4$ and $C_5$ connected to the grounded selector node 46 stores a charge corresponding to the stored voltage $V_a$. Therefore, node $P_4$ sees, in effect, the combination of $C_3$ in parallel to the series connection of $C_4$ and $C_5$ (i.e. $C_4C_5/(C_4+C_5)$), and obtains a charge according to Equation 3.

$$Q = \left(C_3 + \frac{C_4 C_5}{C_4 + C_5}\right) V_a \tag{3}$$

After the voltage at node $P_4$ has reached $V_a$, transistors 42, 43 are turned off and node $P_4$ is left in a floating state, isolated electrically from external sources. In this situation, if sensing point 44 that corresponds to selected node 45 is in contact with a human body, and if sensing point 47 is not in contact with a human body, the initially discharged capacitor $C_4$ draws current from node $P_4$ while the node voltage of sensing point 44 goes from the initial voltage $V_a$ to ground.

Figure 10:
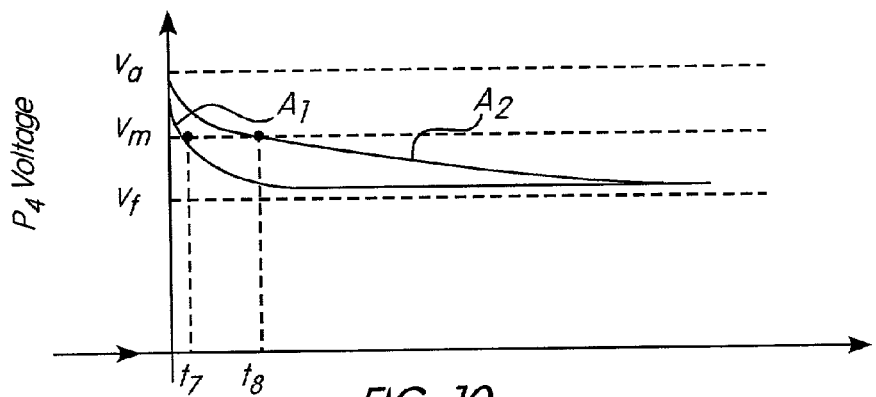
FIG. 10 is a graph of the change over time of the voltage at nod $P_4$ in FIG. 9.

Therefore, as shown in FIG. 10, the voltage of the node $P_4$ draws follows an RC curve $A_1$, and heads towards it's final voltage $V_f$, defined by equation 4.

$$V_f = \frac{V_a \left(C_3 + \frac{C_4 C_5}{C_4 + C_5}\right)}{2C_4 + C_3} \tag{4}$$

At time $t_7$, the voltage at node $P_4$ falls below the reference voltage $V_m$ of comparator 41, and the comparator sends a signal signifying contact with the human body to the signal processing chip 300.

Next, the sensing device discharges capacitor $C_3$, $C_4$ and $C_5$ and selects the next node 46, while grounding all other selecting nodes. After node P$_4$ is charged to voltage V$_a$, transistors 43 and 44 are turned off, and the floating state of node P$_4$ is maintained.

Assume in this that sensing point 44, corresponding to grounded selecting node 45 comes into contact with a human body, while sensing point 47, corresponding to selected node 46 is not in contact with a human body. The charge stored at in capacitors C$_4$ and C$_5$ situated between node P$_4$ and grounded selecting node 45 and at capacitor C$_3$ is redistributed while the voltage at node 44 falls from V$_a$/2 to ground potential. In this case, as shown in FIG. 10, the voltage at node P$_4$ follows an RC curve A$_2$, and heads toward the final voltage V$_f$, define by Equation 4.

At time t$_8$, when the voltage at node P$_4$ falls below the reference voltage of output device 41, for example a comparator, the comparator sends a signal signifying contact with the human body to the signal processing chip 300.

It is to be noted here, that the sensing point corresponding to the selected selection node, undergoes more voltage change than the sensing points corresponding to the non-selected selection nodes (i.e., the grounded nodes), hence the resulting voltage change at node P$_4$ at the beginning phase of the charge redistribution process. As shown in FIG. 10, because the time t$_7$ where RC curve A$_1$ descends beneath the reference voltage of the comparator V$_m$, is faster than the time t$_8$ where RC curve A$_2$ descends beneath the reference voltage of the comparator V$_m$, the signal processing chip 300 is able to tell that the human resistive element at sensing point 47 is larger than the human resistive element at sensing point 44.

Because there are many selecting nodes, if the sensing of the level of human body contact is carried out at each selecting node, then the signal processing chip 300 is able to tell the relative magnitude of resistance of each region of the same human body contact.

Figure 11:
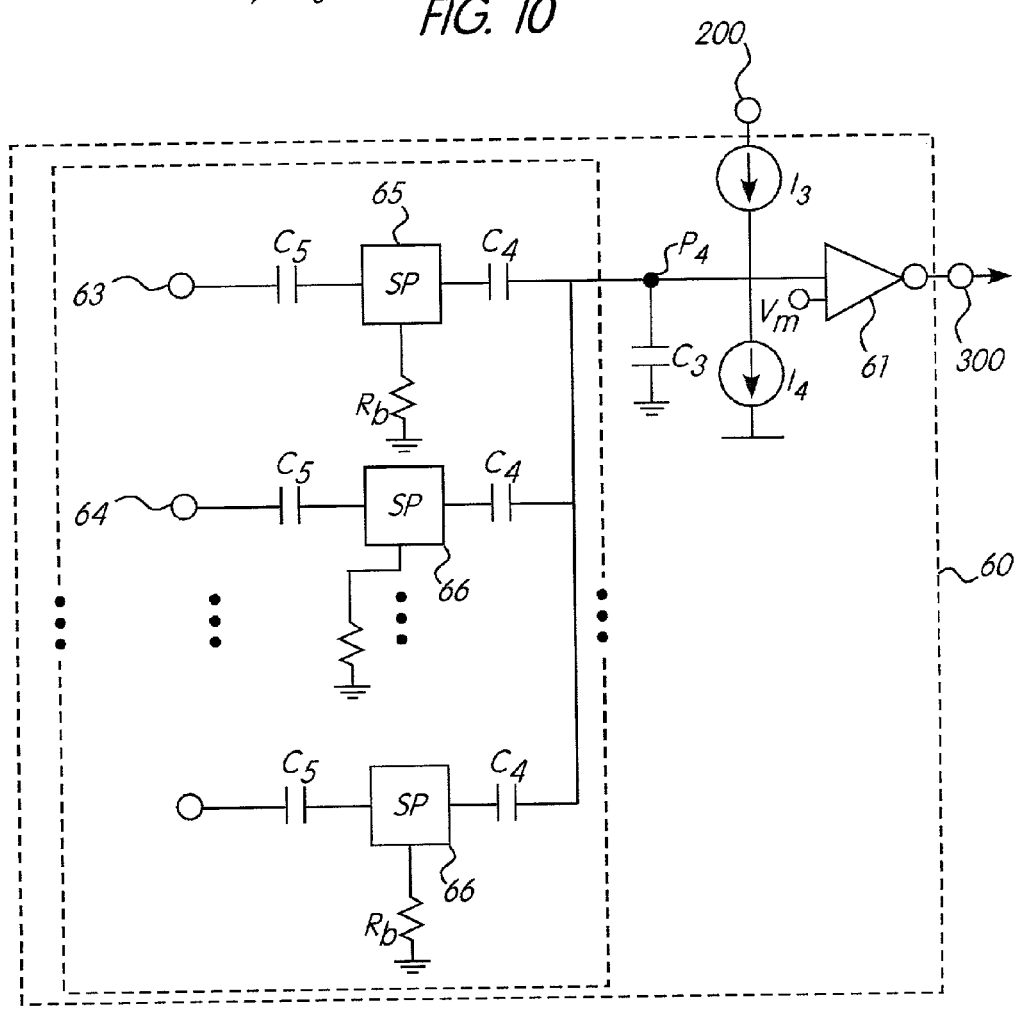
FIG. 11 is a schematic of yet another embodiment of the present invention.
Figure 12:
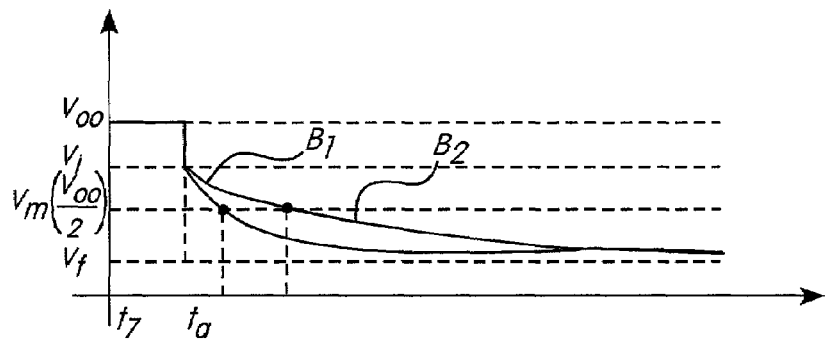
FIG. 12 is a graph of the change over time of the voltage at node $P_4$ in FIG. 11.

In the embodiment shown in FIG. 11, after all capacitors are discharged, multiple sensing points, in this example 63 and 64, are selected while all other selecting nodes are grounded. The selected selecting nodes 63 and 64 are charged to a voltage V$_{DD}$ simultaneously. If this charging action occurs in a sufficiently short time compared to the RC time constant, the amount of charge stored at the storage node is given by Equation 5.

$$Q = \left(C_3 + m \frac{C_4 C_5}{C_4 + C_5}\right) V_{DD} \quad (5)$$

where m is the number of selecting nodes that have not been selected in the charging process, and have remained grounded. After a time which is sufficiently shorter than the RC time constant of this circuit, if all the selection nodes except the one which corresponds to the sensing point which is to be observed are brought to the ground potential, the voltage at the storage node fades to the value of Equation 6.

$$V_i = V_{DD} - \frac{(m-1)\frac{C_4 C_5}{C_4 + C_5}}{C_3 + n \frac{C_4 C_5}{C_4 + C_5}} \quad (6)$$

where n is the total number of selection node, and m is the number of selecting nodes that have not been selected, By choosing the number m of selection node to be grounded and the number (n−m) to be lifted to V$_{DD}$ during the pre-charge period, the V$_i$ can be adjusted to an appropriate level as shown in FIG. 12.

The evaluation procedure thereafter is exactly the case with the embodiment shown in FIG. 9, because the final value of the voltage at the storage node is only determined by the amount of the charge injected to the storage node during the pre-charge period.

The advantage of this method compared to that of FIG. 9 is that, here, comparator 61 can be replaced by an inverter because the voltage level V$_m$ in FIG. 12 can be adjusted to a value at or near V$_{DD}$/2.

The embodiments and operational methods disclosed up to this point are adequate for fingerprint related sensor applications, where each sensing point has its own value of resistances. For other applications, such as a touch pad, there is a region where there is a human body contact and where there is no contact. In such cases, the area of interest is the transition region between the contact and non-contact regions.

Figure 13:
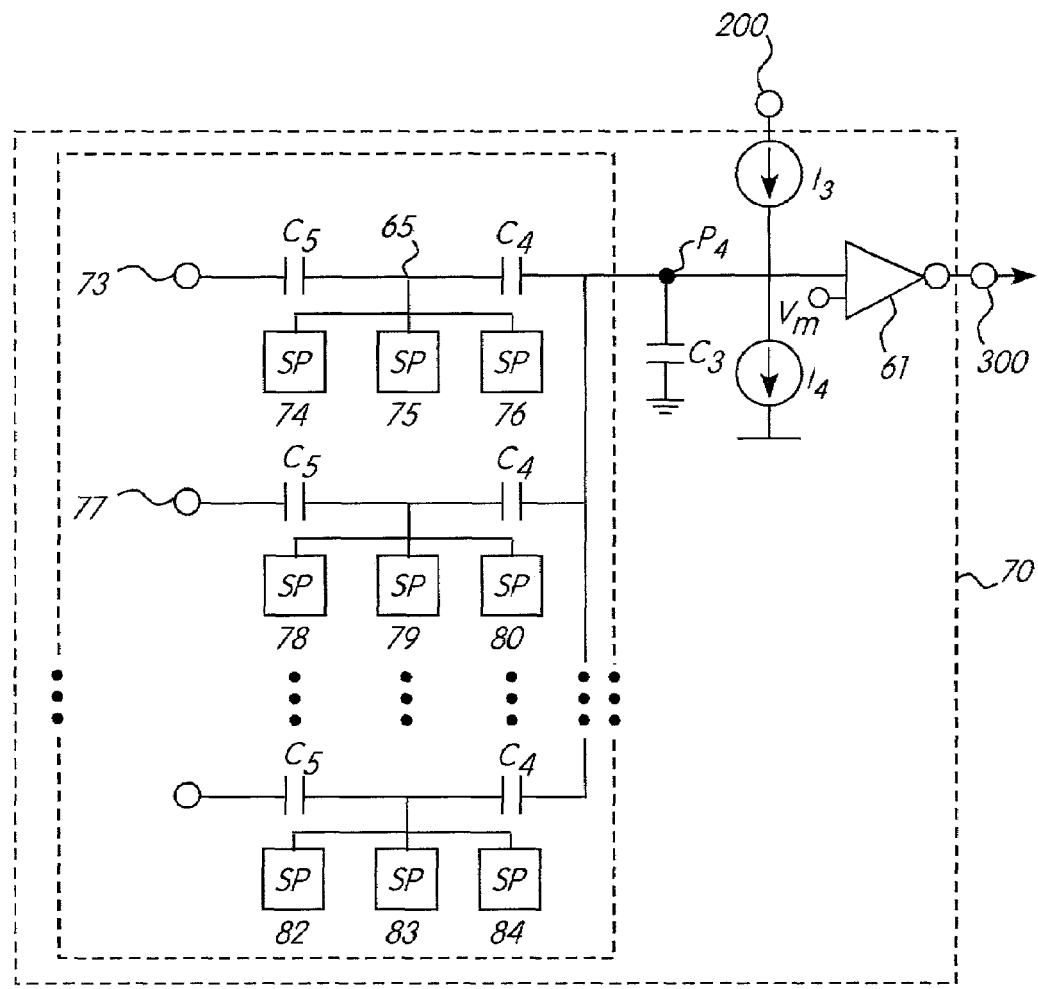
FIG. 13 is a schematic of yet another embodiment of the present invention.
Figure 14:
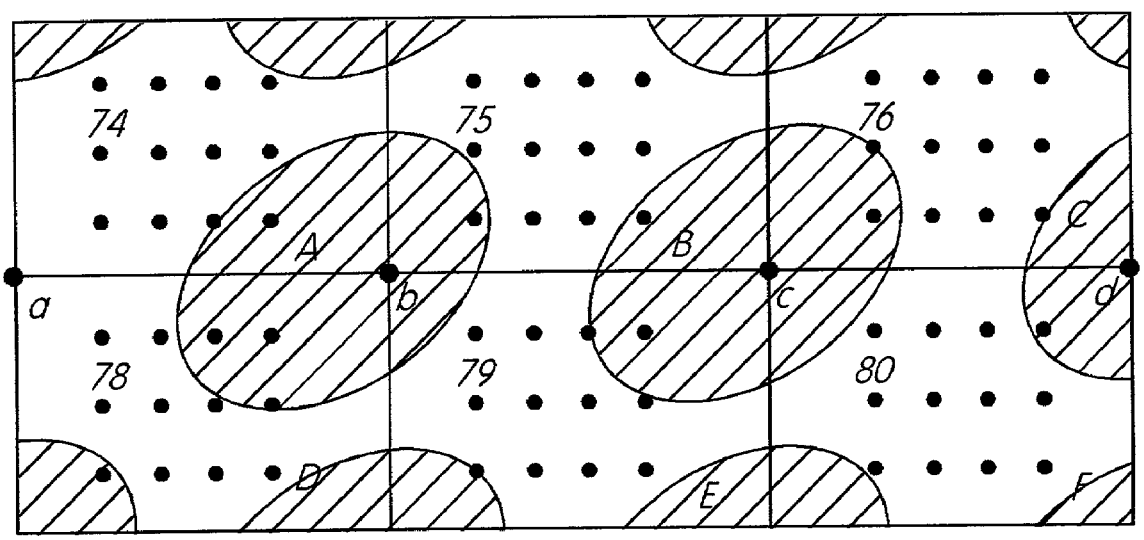
FIG. 14 gives an example of a touch pad, whose sensing area is portioned to several subsections.

For this type of application, the sensing point can be split into several electrodes as shown in FIG. 13. Here, selecting node 73 is used for selecting sensing points 74, 75 and 76, selecting node 77 for sensing points 78, 79 and 80, and so on. If any of sensing points 74, 75 or 76 is in contact with a human body, operation with node 73 selected reveals a contact signal. Therefore, it is conceptually a kind of "wired OR" equivalent operation. These split electrodes can also be distributed as shown in FIG. 14, where the sensing area of a touch pad is partitioned to several areas and the sensing points are repeated regularly. Because the result of evaluation does not reveal which of the multiple sensing point is in contact with human body, the output signal showing the contacted area of a touch pad with 'image' areas.

The "real position detecting sensing points" implemented at appropriate positions (in the figure, the points a, b, c, d) on the touch pad can show which of the multiple 'image' area is the real one. These "real position detecting sensing points" can be a small number, because the purpose of a touch pad is usually to detect the position and movement of the finger on it.

By way of an example, assume that the total number of sensing points on a touch pad is a×b (a=40, b=30). If multiplexed with k selection node (k=8), and split sensing electrodes on a portioned touch pad area (l=6), the number of connecting pins to the signal processing chip is given by Equation 7.

$$\text{\# of pins} = \frac{a \times b}{k \times l} \quad \left(\frac{40 \times 30}{8 \times 6} = 25\right) \quad (7)$$

This means, for example, that without the multiplexing method of this invention an impractical 40×30=1200 pins would have been needed, while with this invention only 25 pins are needed.

As explained in detail previously, this invention improves on the structure of the device that senses the level of human contact and changes the mechanism of sensing from one that sends charge through the human body to one that uses the redistribution of charge. This minimizes the amount of direct current flowing through the body and prevents the discomfort and anxiety felt by the user of the prior art devices.

Next, by employing multiplexing methods with passive circuit elements only in it's internal circuitry, this invention maximizes the sensing device's function and minimizes of the number of pins required on the signal processing chip. Thus, the costs of the device is minimized.

Therefore, this invention can be used very effectively in devices which can be equipped with it such as fingerprint sensors, laptop computers, PDAs, mobile communication devices, electronic calculators, and digital cameras.

Although certain exemplary embodiments have been disclosed, it should be understood that the invention is not limited thereto but may be variously embodied within the scope of the following claims.

I claim:

1. A sensor for sensing the contact level of a human body comprising:
    a plurality of sensing devices arranged in parallel, each of said sensing devices having a selection node initially connected to ground;
    a capacitor, connected in series with said plurality parallel of sensing devices, defining a coupling node therebetween;
    a current source for delivering a charge to said capacitor;
    a current sink for draining said current from said capacitor; and
    an output device for outputting a signal based on the voltage at said node;
    wherein each of said sensing devices comprises:
        a draining capacitor connected to said coupling node;
        a sensing point in series with said draining capacitor; and
        an isolating capacitor in series with said sensing point and connected to said selection node;
    wherein said sensing point defines a resistance to ground when in contact with a human body part.

2. The sensor of claim 1 further comprising a signal processing device coupled to said output device.

3. The sensor of claim 1 wherein said current source is a transistor connected between a voltage source and said coupling node and wherein said current sink is a transistor connected between said coupling node and ground.

4. The sensor of claim 1 wherein said output device is a selected from a group consisting of a comparator and in inverter.

5. The sensor of claim 1 wherein said each of said sensing points in said sensing devices comprise a plurality of sensing points arranged in a parallel relationship.

6. A method for sensing the level of contact between a sensing point and a human body comprising the steps of:
    charging a first capacitor connected between ground and a node to a voltage below a threshold voltage;
    applying a selecting voltage to one of a plurality of sensing devices, said selecting voltage causing the voltage at said node to rise to a voltage above said threshold voltage;
    outputting a signal if said voltage at said node falls below said threshold voltage;
    deselecting said selected sensing device by grounding said selecting node; and
    allowing current to flow from said first capacitor to said sensing device when said sensing device is in contact with a human body.

7. A method of claim 6 wherein said charging step comprises the steps of:
    discharging said first capacitor;
    charging said first capacitor such that the voltage at said node rises to a voltage above a threshold voltage.
    draining said first capacitor such that the voltage at said node falls to a voltage below said threshold voltage.

8. The method of claim 6 wherein said step of applying a selecting voltage comprises applying a selecting voltage to a plurality of sensing devices.

* * * * *

UNITED STATES PATENT AND TRADEMARK OFFICE
CERTIFICATE OF CORRECTION

PATENT NO. : 7,006,078 B2
DATED : February 28, 2006
INVENTOR(S) : Wonchan Kim

It is certified that error appears in the above-identified patent and that said Letters Patent is hereby corrected as shown below:

<u>Column 10,</u>
Line 3, delete "a".
Line 4, change "in" to -- an --.
Line 6, delete the first occurrence of "said".

Signed and Sealed this

Sixth Day of June, 2006

JON W. DUDAS
*Director of the United States Patent and Trademark Office*